United States Patent [19]
Dengs et al.

[11] Patent Number: 4,565,276
[45] Date of Patent: Jan. 21, 1986

[54] AUTOWALK

[75] Inventors: Bernd Dengs, Heiligenhaus, Fed. Rep. of Germany; Neil Dyson, Bradford, Great Britain

[73] Assignee: O&K Orenstein & Koppel Aktiengesellschaft, Berlin, Fed. Rep. of Germany

[21] Appl. No.: 481,282

[22] Filed: Apr. 1, 1983

[30] Foreign Application Priority Data

Apr. 6, 1982 [DE] Fed. Rep. of Germany ....... 3213322

[51] Int. Cl.[4] ............................................. B66B 9/12
[52] U.S. Cl. ................................... 198/321; 198/333
[58] Field of Search ............... 198/321, 333, 334, 708, 198/715, 792

[56] References Cited

U.S. PATENT DOCUMENTS

| | | | |
|---|---|---|---|
| 630,803 | 8/1899 | Decker | 198/708 |
| 898,794 | 9/1908 | Seeberger | 198/333 |
| 1,491,641 | 4/1924 | Stephens | 198/708 |
| 2,823,785 | 2/1958 | Hefti | 198/333 |
| 3,144,123 | 8/1964 | Wiese | 198/708 |
| 3,513,780 | 5/1970 | Jenkins | 198/321 |
| 3,616,891 | 11/1971 | Earle | 198/333 |
| 3,750,863 | 8/1973 | Dyczynski | 198/321 |

FOREIGN PATENT DOCUMENTS

| | | | |
|---|---|---|---|
| 2285329 | 4/1976 | France | 198/333 |
| 1525464 | 9/1978 | United Kingdom | 198/708 |

*Primary Examiner*—Joseph E. Valenza
*Assistant Examiner*—Daniel R. Alexander
*Attorney, Agent, or Firm*—Martin A. Farber

[57] ABSTRACT

An autowalk with individual step segments with a lower return travel coarse therefor, in which an elastic bridge closing the gap between step plates is provided between every two adjacent step segments.

23 Claims, 7 Drawing Figures

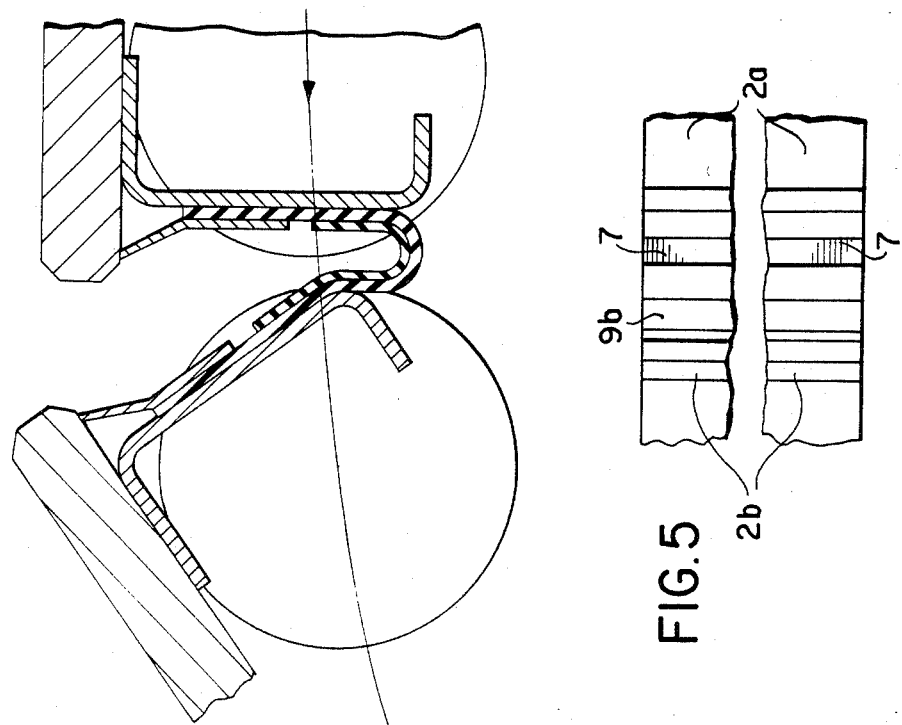
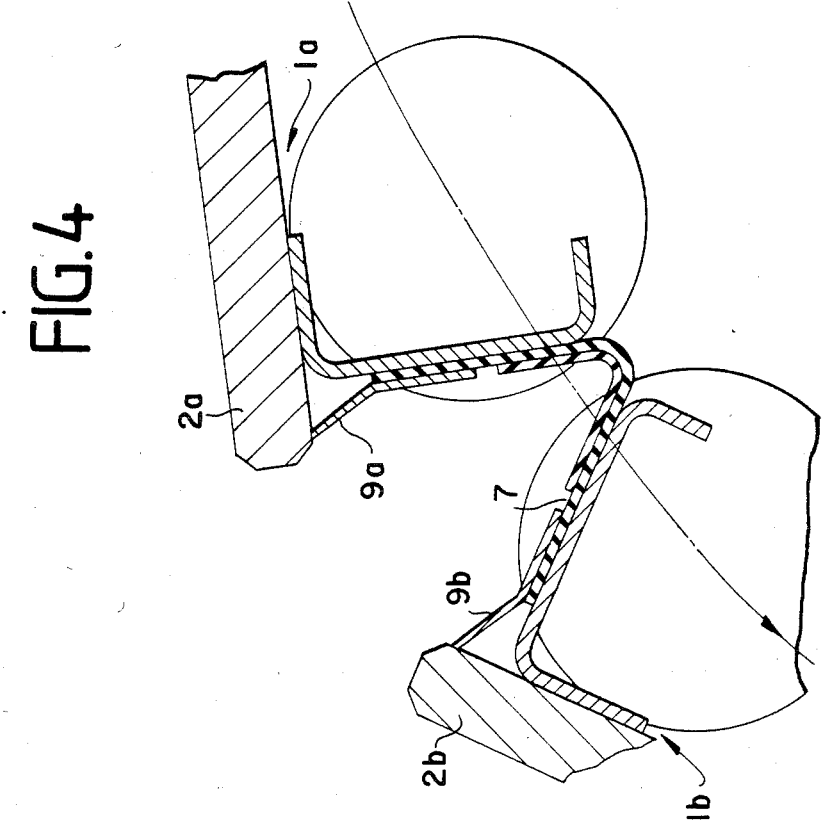
FIG. 4
FIG. 5

AUTOWALK

The present invention relates to an autowalk having individual step segments and lower return travel course therefor.

In the known autowalks of this type it is not possible to avoid the presence of a gap between the individual step segments even upon the straight-line travel. As has been found from practical experience, foreign particles enter through this gap into the interior moving mechanism of the autowalk. These foreign particles may be solid nature, such as sand, or, on the other hand, they may consist of lighter particles such as fluff or the like and, finally, liquid may also pass through this gap between the step segments and into the inside of the moving mechanism. As a result, on the one hand, the moving mechanism will be damaged after a longer or shorter period of time, while, on the other hand, the foreign particles may also combine with the lubricant of the moving mechanism and then, particularly when oil is used, constitute an accumulation of inflammable material.

In order to assure the safety of such means of conveyance, which are intended in particular for people, maintenance is therefore necessary at given time intervals, during which times the means of conveyance, i.e. the autowalk, is not available for use. This, therefore, not only results in expenses for cleaning which must be effected but, in addition, the means of conveyance is not available. Practice has shown that the down times are definitely of importance as compared with the operating times and thus constitute a considerable disadvantage of such conveyor systems.

The object of the invention is to increase the efficiency of autowalks of the type above-mentioned by suitable measures. This is to be accomplished both with regard to the amount of total operating hours and to a reduction in the down time caused by required maintenance.

One solution of this objective in accordance with the present invention resides in providing an elastic bridge between every two adjacent step segments, the bridge bridging the gap between the step plates of the segments.

Such an elastic bridge covers the gap during linear travel of the step segments and thereby prevents the penetration of foreign bodies into the moving mechanism. During the course of their movement, when the step segments come into the region of the reversal rollers then the distance between every two adjacent step segments widens and foreign bodies which are in the elastic bridge between the step plate gap drop out, only in a determinable region between the step segments, into collection spaces provided for this purpose. It is also possible, as a further development of the invention, to avoid such dropping out entirely and to bring the foreign bodies back out of the gap from a pocket.

The simplest form of a bridge for the gap between step plates can be obtained by providing the step-plate edges of each step segment below the comb meshing level with a profiled sealing member which elastically closes the gap and prevents foreign bodies from dropping through into the interior of the mechanism.

Such a profiled sealing member can also be provided on the step-plate carrier below each step-plate edge. Wit both arrangements a reduction in the injurious action of foreign bodies on the autowalk is obtained.

One advantageous further development of the invention resides in connecting every two adjacent step segments together by an elastic dirt collection loop. Such a dirt collection loop is formed of a piece of elastic foil the largest sides of which are connected firmly to the adjacent step plates or step-plate carriers. The then hanging shape of the foil forms a loop-shaped structure in extension of the gap of the step plate. In order to prevent foreign bodies nevertheless from entering into the gap between the step plate and the step-plate carrier body, a dirt guide shield is provided on each step plate. This dirt guide shield extends in the direction of the dirt collection loop and covers each attachment thereof to the step-plate carrier body. This has the further advantage that, in the region of reversal of the direction of travel of the step segments where the gaps open up, dirt which has fallen between the individual segments into the loop is again removed from the gap with greater certainty. In order to definitely prevent the penetration of dirt into the autowalk over the entire width of a segment, the dirt collection loop is provided over the entire width of the step plate.

In order furthermore to prevent liquid which enters the gap from entering the moving mechanism of the autowalk, the dirt collection loop is provided on its lateral side edges which are open in the manner of a bent foil, with beads which are directed in the direction towards the step plate gap. These edges prevent a certain amount of liquid which has penetrated therein from lateral flowing out of the loop.

In order to avoid the danger of fire, elastic step-plate gap bridges made of refractory material are provided. Furthermore, a material is selected which is resistant also to the action of chemicals.

With the above and other objects and advantages in view, the present invention will become more clearly understood in connection with the detailed description of preferred embodiments, when considered with the accompanying drawings, of which:

FIG. 4 is a view of FIG. 3, but showing the opening of the gap in the region of reversal of the autowalk;

FIG. 5 is a top plan view broken away in part of the left two adjacent step segments of FIG. 4;

In the drawings the same parts are provided with the same numbers in the different figures.

Figure 1:
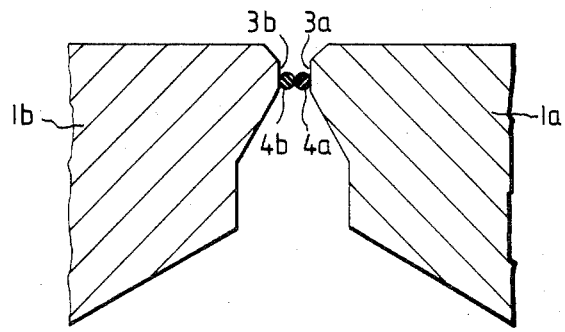
FIG. 1 is a longitudinal broken-away cross-sectional view showing an arrangement in which a profiled sealing member is provided at each edge of a step plate.

FIG. 1 shows two adjacent autowalk step segments constituting step plates 1a and 1b, respectively, which may be made, for example, of single castings. Profiled sealing members 4a and 4b are mounted on adjacent edges 3a and 3b of the step plates.

Figure 2:
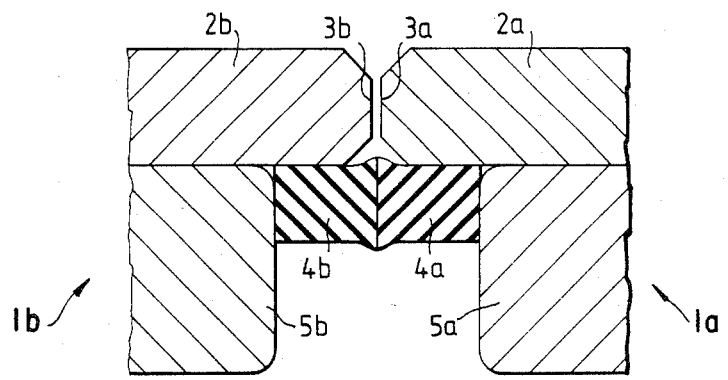
FIG. 2 is a similar view of another embodiment with profiled sealing members provided on the step-plate carrier body below each edge of the step plates.

FIG. 2 shows a step segment constructed of several parts in that step plates 2a and 2b are fastened to step-plate carrier members 5a and 5b respectively. The profiled sealing members 4a and 4b are provided on the step-plate carrier members 5a and 5b respectively.

In FIGS. 1 and 2 the sealing members 4a, 4b constitute a bridge between the gap between the adjacent edges of the step plates 2a, 2b.

Figure 3:
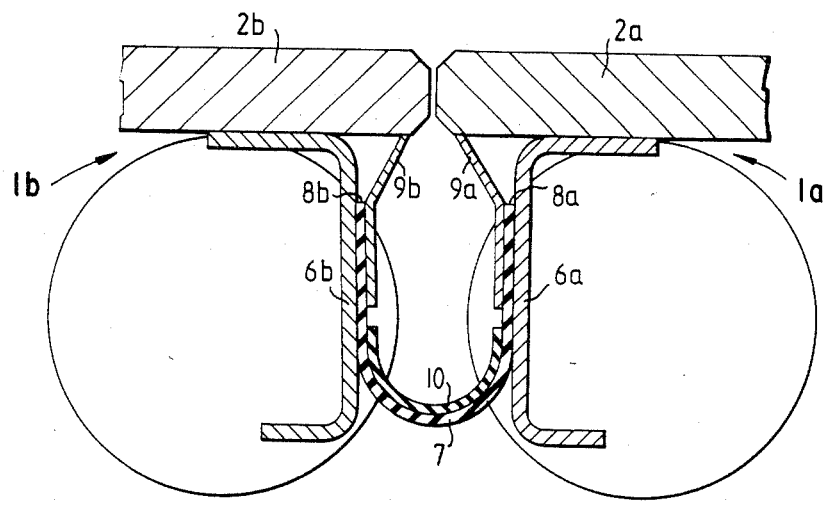
FIG. 3 is a similar view of another embodiment showing an arrangement of two adjacent step segments with an elastic dirt collection loop bridging the gap between the step plates.
Figure 6:
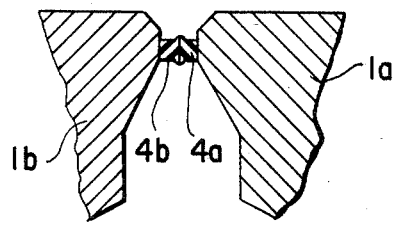
FIG. 6 is a view similar to FIG. 1 showing rectangular sealing members on adjacent edges of the step plates.
Figure 7:
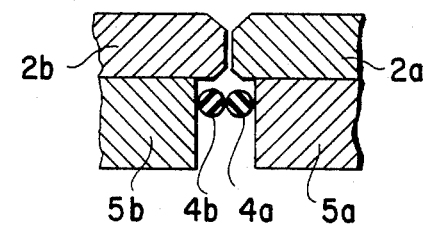
FIG. 7 is a view similar to FIG. 2 showing circular sealing members on the step plate carriers.

In FIG. 3, the bridge comprises a dirt collecting loop 7 which is fastened to step plate carriers 6a and 6b. Each end 8a and 8b of the dirt collecting loop is fastened to a step segment (2a, 6a and 2b, 6b respectively), namely in the embodiment, which is shown by way of example, one end 8a to the step-plate carrier 6a and the other end 8b to the step-plate carrier 6b. Dirt guide shields 9a and 9b are respectively fastened between the ends 8a, 8b of the dirt collecting loop 7 and the step plates 2a, 2b. The dirt collecting loop furthermore has upwardly extending beads 10 at its lateral edges which prevent liquid from spilling out sidewise from the loop 7.

FIG. 4 shows the gap which opens (widens) up between two adjacent plates in the region of the reversal region of the autowalk during its course of motion. Any foreign bodies or liquids possibly present in the dirt collection loop being then, during the continued course of movement of the members are discharged downwardly into a collecting space.

We claim:

1. An autowalk comprising
a plurality of individual step segments including step plates disposed with a gap between one another in a continuous arrangement defining an upper course adapted to carry people and a lower return travel course under said upper course, the step plates in the upper course being substantially at a comb mesh level in one horizontal plane,
an elastic bridge respectively arranged between every two adjacent of said step segments bridging said gaps between said step plates respectively,
each said bridge being below the comb mesh level when respective adjacent steps are in said upper course, said elastic bridge having means on said bridge and adjacent each lateral side thereof to prevent debris from spilling out sidewise, said bridge and said means forming a debris-catching pocket opening into said gap for catching the debris when it is in said upper course and said pocket being positioned so as to discharge the debris from said pocket at a predetermined position substantially where said upper course and said pocket turn upside down into said lower course.

2. The autowalk according to claim 1, defining a comb meshing level, and wherein
said bridge comprises a sealing member mounted on each adjacent edge of said step plates of said step segments below the comb meshing level.

3. An autowalk comprising
a plurality of individual step segments including step plates disposed with a gap adjacent one another in a continuous arrangement defining an upper course adapted to carry people and a lower return travel course,
an elastic bridge respectively arranged between every two adjacent of said step segments bridging said gaps between said step plates respectively,
said bridge comprises a sealing member mounted on each adjacent edge of said step plates of said step segments below the comb meshing level,
a separate of said sealing members are mounted on said each adjacent edge of said step plates, adjacent said separate sealing members elastically press against each other at least in said upper course.

4. The autowalk according to claim 3, wherein
said sealing members have a substantially circular cross-section.

5. The autowalk according to claim 3, wherein
said sealing members have a substantially rectangular cross-section.

6. The autowalk according to claim 1, wherein
said step segments further include step plate carriers, said step plates are respectively mounted on said step plate carriers,
every two said adjacent step plates have edges facing each other defining said gap therebetween,
said bridge comprises a sealing member mounted on said step plate carriers, respectively, below each of said edges of each said step plates.

7. An autowalk comprising
a plurality of individual step segments including step plates disposed with a gap adjacent one another in a continuous arrangement defining an upper course adapted to carry people and a lower return travel course, the step plates in the upper course being substantially at a comb mesh level,
an elastic bridge respectively arranged between every two adjacent of said step segments bridging said gaps between said step plates respectively,
each said bridge being below the comb mesh level when respective adjacent steps are in said upper course and comprising a debris-catching pocket opening into said gap for catching debris when it is in said upper course and said pocket being positioned so as to discharge the debris from said pocket at a predetermined position when said upper course of said pocket turns into said lower course,
said step segments further include step plate carriers, said step plates are respectively mounted on said step plate carriers,
every two said adjacent step plates have edges facing each other defining said gap therebetween,
said bridge comprises a sealing member mounted on said step plate carriers, respectively, below each of said edges of each said step plates,
a separate respective one of said sealing members is mounted on a facing edge of each said step plate carriers, and adjacent ones of said sealing members elastically press against each other at least in said upper course.

8. The autowalk according to claim 7, wherein
said sealing members have a substantially circular cross-section.

9. The autowalk according to claim 7, wherein
said sealing members have a substantially rectangular cross-section.

10. The autowalk according to claim 1, wherein
said bridge comprises an elastic dirt collection loop respectively connecting said every two adjacent step segments together.

11. The autowalk according to claim 10, wherein
said dirt collection loop is an elastic foil.

12. The autowalk according to claim 10, wherein
said dirt collection loop has ends, each of said ends is firmly attached at a respective attachment position of said adjacent step segments.

13. The autowalk according to claim 12, wherein said step segments further include step plate carriers,
said step plates are respectively mounted on said step plate carriers,
said ends are attached to said step plate carriers at said attachment positions.

14. An autowalk comprising
a plurality of individual step segments including step plates disposed with a gap adjacent one another in a continuous arrangement defining an upper course adapted to carry people and a lower return travel course,
an elastic bridge respectively arranged between every two adjacent of said step segments bridging said gaps between said step plates respectively,
said bridge comprises an elastic dirt collection loop respectively connecting said every two adjacent step segments together,
said dirt collection loop has ends, each of said ends is firmly attached at attachment positions to one of said adjacent step segments,
a dirt guide shield is mounted on each said step plate and extends therefrom in a direction of said dirt collection loop, said dirt guide shield covers each said attachment position of a corresponding said end of said dirt collection loop.

15. An autowalk comprising
a plurality of individual step segments including step plates disposed with a gap adjacent one another in a continuous arrangement defining an upper course adapted to carry people and a lower return travel course,
an elastic bridge respectively arranged between every two adjacent of said step segments bridging said gaps between said step plates respectively,
said bridge comprises an elastic dirt collection loop respectively connecting said every two adjacent step segments together,
said dirt collection loop has ends, each of said ends is firmly attached at attachment positions to one of said adjacent step segments,
said step segments further include step plate carriers,
said step plates are respectively mounted on said step plate carriers,
said ends are attached to said step plate carriers at said attachment positions, and
a dirt guide shield is mounted on each said step plate and extends therefrom in a direction of said dirt collection loop, said dirt guide shield covers each said attachment position of a corresponding said end of said dirt collection loop.

16. The autowalk according to claim 14, wherein said dirt collection loop extends transversely across the entire width of said step plates.

17. The autowalk according to claim 14, wherein said dirt collection loop has beads on lateral sides edges thereof, said beads extend from said dirt collection loop in a direction towards said gap.

18. An autowalk comprising
a plurality of individual step segments including step plates disposed with a gap adjacent one another in a continuous arrangement defining an upper course adapted to carry people and a lower return travel course,
an elastic dirt collection loop respectively connects every two adjacent said step segments together,
said dirt collection loop has ends, each of said ends is firmly attached at an attachment position to one of said adjacent step segments respectively,
a dirt guide shield is mounted on each said step plate and extends therefrom in a direction of said dirt collection loop, said dirt guide shield covers each said attachment position of a corresponding said end of said dirt collection loop.

19. The autowalk according to claim 18, wherein said elastic bridge is made of refractory material.

20. The autowalk according to claim 18, wherein said step segments further include step plate carriers,
said step plates are respectively mounted on said step plate carriers,
said ends are attached to said step plate carriers at said attachment position.

21. The autowalk according to claim 18, wherein said dirt collection loop extends transversely across the entire width of said step plates.

22. The autowalk according to claim 18, wherein said dirt collection loop has beads on lateral side edges thereof, said beads extend from said dirt collection loop in a direction towards said gap.

23. The autowalk according to claim 18, wherein each said collection loop and the associated said shields extend below said step plates when the latter is in said upper course, said shields have lower ends, the latter being spaced from each other forming a mouth opening into said collection loop, the latter defining a hollow trough between said adjacent step segments.

* * * * *